US012672075B2

(12) United States Patent
Yang

(10) Patent No.: US 12,672,075 B2
(45) Date of Patent: Jun. 30, 2026

(54) METHOD FOR OBTAINING CONFIGURATION INFORMATION AND METHOD FOR PROVIDING CONFIGURATION INFORMATION, ELECTRONIC DEVICE, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 355 days.

(21) Appl. No.: 17/920,779

(22) PCT Filed: Apr. 23, 2020

(86) PCT No.: PCT/CN2020/086419
§ 371 (c)(1),
(2) Date: Oct. 21, 2022

(87) PCT Pub. No.: WO2021/212414
PCT Pub. Date: Oct. 28, 2021

(65) Prior Publication Data
US 2023/0171706 A1 Jun. 1, 2023

(51) Int. Cl.
*H04W 52/28* (2009.01)
*H04W 52/02* (2009.01)

(52) U.S. Cl.
CPC ....... *H04W 52/28* (2013.01); *H04W 52/0261* (2013.01)

(58) Field of Classification Search
CPC . H04W 52/28; H04W 52/02; H04W 52/0261; H04W 52/00
See application file for complete search history.

(56) References Cited

U.S. PATENT DOCUMENTS

2019/0104404 A1* 4/2019 Tang ........................ H04W 8/24
2019/0313340 A1 10/2019 Lee et al.
(Continued)

FOREIGN PATENT DOCUMENTS

CN 106664653 A 5/2017
CN 108513342 A 9/2018
(Continued)

OTHER PUBLICATIONS

International Search Report issued in Application PCT/CN2020/086419, dated Jan. 8, 2021,(6p).
(Continued)

*Primary Examiner* — Jinsong Hu
*Assistant Examiner* — Farideh Madani
(74) *Attorney, Agent, or Firm* — Arch & Lake LLP; Hao Tan; Shen Wang

(57) ABSTRACT

Provided are a method for obtaining configuration information and a method for providing configuration information, an electronic device, and a storage medium. The method for obtaining configuration information comprises: a user terminal sending energy information of the user terminal to a base station; the user terminal receiving configuration information sent by the base station, wherein the configuration information is determined by the base station according to the energy information; and the user terminal communicating with the base station on the basis of the configuration information.

20 Claims, 3 Drawing Sheets

(56) References Cited

U.S. PATENT DOCUMENTS

| | | | | |
|---|---|---|---|---|
| 2020/0053602 A1 | | 2/2020 | Kadiri et al. | |
| 2020/0178172 A1 | * | 6/2020 | Thangarasa | H04W 76/28 |
| 2021/0051585 A1 | * | 2/2021 | Kim | H04W 52/0216 |
| 2022/0078779 A1 | * | 3/2022 | Xu | H02J 50/001 |
| 2022/0116776 A1 | * | 4/2022 | Spangler | H04W 12/0431 |

FOREIGN PATENT DOCUMENTS

| | | | | |
|---|---|---|---|---|
| CN | 108924916 A | * | 11/2018 | |
| CN | 110431864 A | | 11/2019 | |
| CN | 110557780 A | | 12/2019 | |
| CN | 110636581 A | | 12/2019 | |
| CN | 110719623 A | | 1/2020 | |
| CN | 110831096 A | | 2/2020 | |
| CN | 110876184 A | | 3/2020 | |

OTHER PUBLICATIONS

CNOA of Application No. 202080000737.7 dated on May 7, 2021 with English translation,(21p).

Second CNOA of Application No. 202080000737.7 dated on Dec. 1, 2021 with English translation, (28p).

Samsung, "Assistance information from UE to eNB for eDDA", 3GPP TSG-RAN WG2 #77Bis, R2-121465, Mar. 26-Mar. 30, 2012, Jeju, Korea,(4p).

* cited by examiner

METHOD FOR OBTAINING CONFIGURATION INFORMATION AND METHOD FOR PROVIDING CONFIGURATION INFORMATION, ELECTRONIC DEVICE, AND STORAGE MEDIUM

CROSS-REFERENCE

The present application is the U.S. National Stage of International Application No. PCT/CN2020/086419, filed on Apr. 23, 2020, the contents of which are incorporated herein by reference in their entireties for all purposes.

TECHNICAL FIELD

The present disclosure relates to the field of communication technologies, and in particular, to a method for obtaining configuration information, a method for providing configuration information, an electronic device, and a computer-readable storage medium.

BACKGROUND

With the development of wireless communication technologies, mobile communication systems are gradually evolving to fifth generation (5G) communication systems. The 5G communication systems are considered to be implemented in higher frequencies (millimeter waves) and higher bands (e.g., a 60 GHz band) in order to achieve higher data rates.

In the 5G communication systems, base stations can obtain information reported by User Equipments (UEs), and configure appropriate parameters for the UEs according to the information.

SUMMARY

Various embodiments of the present disclosure provide the following technical solutions.

According to a first aspect of the present disclosure, provided is a method for obtaining configuration information. The method may include: sending, by a user terminal, energy information of the user terminal to a base station; receiving, by the user terminal, configuration information sent by the base station, where the configuration information is determined by the base station according to the energy information; and communicating, by the user terminal, with the base station based on the configuration information.

According to a second aspect of the present disclosure, provided is a method for configuring information. The method may include: receiving, by a base station, energy information sent by a user terminal; determining, by the base station, configuration information of the user terminal based on the energy information; and sending, by the base station, the configuration information to the user terminal.

According to a third aspect of the present disclosure, provided is a user terminal including a memory, a processor and a computer program stored on the memory and executable on the processor. The processor is configured to send energy information of the user terminal to a base station; receive configuration information sent by the base station, where the configuration information is determined by the base station according to the energy information; and communicate with the base station based on the configuration information.

According to a fourth aspect of the present disclosure, provided is a base station device including a memory, a processor and a computer program stored on the memory and executable on the processor. The processor is configured to receive energy information sent by a user terminal; determine configuration information of the user terminal based on the energy information; and send the configuration information to the user terminal.

According to a fifth aspect of the present disclosure, provided is a computer-readable storage medium having a computer program stored thereon, which, when executed by a processor, implements the method according to the first or second aspect.

Additional aspects and advantages of the embodiments of the present disclosure will be set forth in part in the following description, which will become apparent from the following description, or will be learned by practice of the present disclosure.

BRIEF DESCRIPTION OF THE DRAWINGS

The above and other aspects, features and advantages of embodiments of the present disclosure will become more clear from the following description in conjunction with the accompanying drawings, in which.

Throughout the accompanying drawings, it should be noted that like reference signs are used to depict the same or similar elements, features and structures.

DETAILED DESCRIPTION

Figure 1:
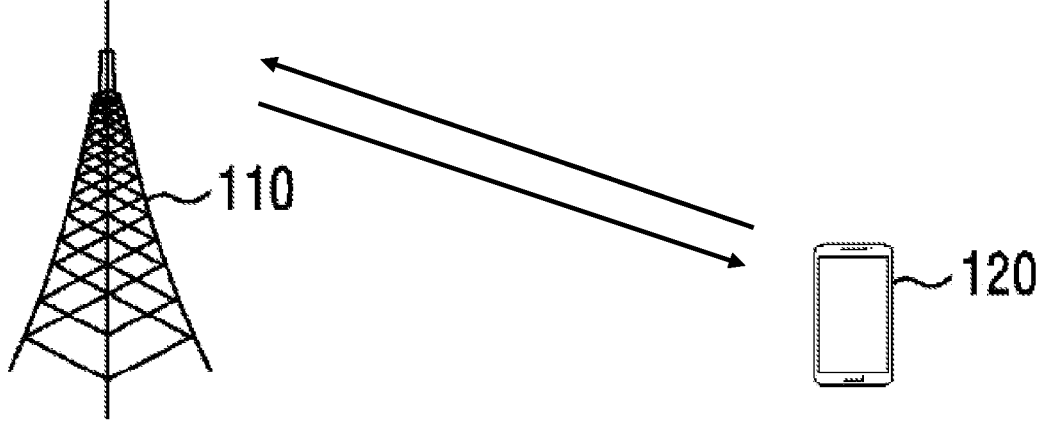
FIG. 1 is a schematic diagram showing a wireless communication system according to an embodiment of the present disclosure.

The following description with reference to the accompanying drawings is provided to assist in a comprehensive understanding of various embodiments of the present disclosure as defined by the appended claims and their equivalents. The various embodiments of the present disclosure include various specific details, which are to be regarded as merely illustrative. Accordingly, those of ordinary skill in the art will recognize that various changes and modifications can be made to the various embodiments described herein without departing from the scope and spirit of the present disclosure. In addition, the description of well-known functions and constructions may be omitted for clarity and conciseness.

The terms and words used in the present disclosure are not limited to written meanings, but are merely used by the inventor to enable a clear and consistent understanding of the present disclosure. Accordingly, for those skilled in the art, the descriptions of the various embodiments of the present disclosure are provided for purposes of illustration and not of limitation.

It should be understood that singular forms "a," "an," "said," and "the" as used herein can also include plural forms unless the context clearly dictates otherwise. It should be further understood that the word "including" or "comprising" as used in the present disclosure refers to the presence of the described features, integers, steps, operations, elements and/or components, but does not preclude the presence or addition of one or more other features, integers, steps, operations, elements, components and/or a combination thereof.

It should be understood that when an element is referred to as being "connected" or "coupled" to another element, it can be directly connected or coupled to the other element or an intervening element may also be present. Furthermore, "connected" or "coupled" as used herein may include wirelessly connected or wirelessly coupled. Furthermore, those of ordinary skill in the art will appreciate that the accompanying drawings provided herein are for illustrative purposes and are not necessarily drawn to scale. As used herein, the term "and/or" includes any and all combinations of one or more of the associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In order to make the objectives, technical solutions and advantages of the embodiments of the present disclosure more clear, the embodiments of the present disclosure will be further described in detail below with reference to the accompanying drawings.

FIG. 1 is a schematic diagram showing a wireless communication system according to an embodiment of the present disclosure.

In FIG. 1, a base station (BS) 110 and a user terminal (UE) 120 may be nodes that use wireless channels in a wireless communication system. The wireless communication system may be a 5G system, which is also called a New Radio (NR) system. Alternatively, the wireless communication system may also be a next-generation system of the 5G system. Although FIG. 1 only shows one base station and one UE, the embodiments of the present disclosure are not limited thereto, for example, other base stations and other UEs that are the same as or similar to the base station 110 and the UE 120 may also be included.

The base station 110 is a network infrastructure that provides wireless access for the UE 120. For example, the base station 110 may be a gNB that adopts a central distributed architecture in the 5G system. When the base station 120 adopts the central distributed architecture, it typically includes a Central Unit (CU) and at least two Distributed Units (DUs). The central unit is provided with protocol stacks of a Packet Data Convergence Protocol (PDCP) layer, a Radio Link Control (RLC) layer, and a Media Access Control (MAC) layer, and the distributed unit is provided with a protocol stack of a Physical (PHY) layer. A specific implementation of the base station 120 is not limited by the embodiments of the present disclosure.

The UE 120 may communicate with one or more core networks (e.g., 5G core networks) via a Radio Access Network (RAN). The UE 120 may be a device used by a user, which may provide voice and/or data connectivity to the user and may perform communication with the base station 110 through the wireless channel. The UE (e.g., UE 120) according to the various embodiments of the present disclosure may include, for example, at least one of a smart phone, a mobile phone (or a "cellular" phone), a wearable device, a tablet PC, an e-book reader, a desktop PC, a notebook PC, a netbook computer, a workstation, a server, a PDA, a Portable Multimedia Player (PMP), an MP3 player, a medical device and a camera.

A wireless connection can be established between the base station 110 and the UE 120 through a wireless air interface. In different embodiments, the wireless air interface is a wireless air interface based on the fifth generation mobile communication network technology (5G) standard, for example, the wireless air interface is a new radio; alternatively, the wireless air interface can also be a wireless air interface based on the next generation mobile communication network technology standard of 5G.

It will be appreciated that the wireless communication system shown in FIG. 1 is merely illustrative, and the embodiments of the present disclosure are not limited thereto. For example, the wireless communication system may further include a network management device (not shown) as a core network device in the wireless communication system, and the base station 110 may be connected to the network management device.

Referring to FIG. 1, in order to save the power consumption of the UE 120, a method for reporting assistance information by the UE is introduced. The UE 120 may report a desired configuration to the base station 110, including a Discontinuous Reception (DRX) period, a DRX inactivity timer, a bandwidth, the number of secondary cells, the number of MIMO layers, and the like. The base station 110 may configure an appropriate parameter for the UE according to the assistance information reported by the UE 120.

According to an embodiment, in a Non-Terrestrial Network (NTN), a base station may be deployed on a high-altitude platform, thereby providing services for UEs in a large area. The high-altitude platform can include a high-altitude balloon, a low-earth orbit satellite, a medium-earth orbit satellite, a geostationary satellite, a polar-orbit satellite or the like, and heights of these platforms from the ground are continuously increasing, from 5 km to 50,000 km. The higher the platform, the greater the transmit power of the UE and the higher the orbit, the larger the coverage area of the base station and the slower the moving speed relative to the earth surface.

In addition, with the popularity of wireless charging, the UE (e.g., a 5G mobile phone, a computer, a Customer Premise Equipment (CPE), etc.) can be in an active state or a high-power charging state for a long time, or can have a large power reserve. Therefore, the UE is not sensitive to the consumption of the power, and requires a higher performance transceiving parameter configuration. In this case, from the perspective of the user terminal, the QoE of the user terminal can be improved, and from the perspective of the network, the frequency utilization can be improved and the capacity of the network can be increased.

The embodiments of the present disclosure provide a method for obtaining configuration information and a method for providing configuration information, which can be applied in the wireless communication system, so that the base station can obtain energy information of the UE, so as to reasonably provide the UE with a configuration according to an energy condition of the UE.

Figure 2:
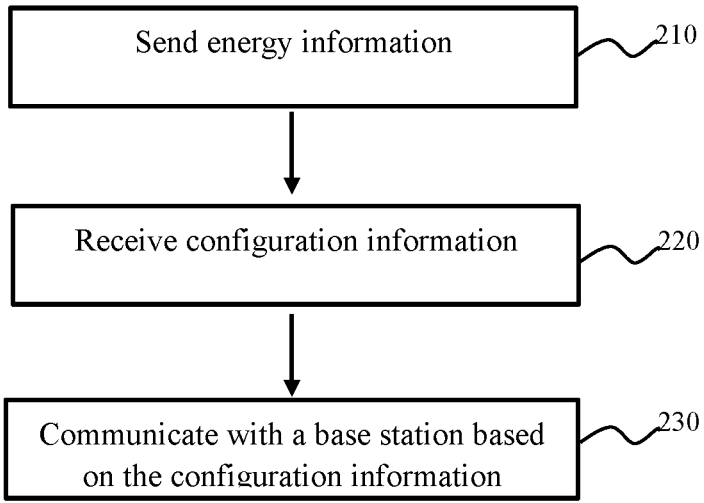
FIG. 2 is a flowchart showing a method for obtaining configuration information according to an embodiment of the present disclosure.

FIG. 2 is a flowchart showing a method for obtaining configuration information according to an embodiment of the present disclosure. The method may be applied in the wireless communication system shown in FIG. 1 and may be performed by the UE 120 in FIG. 1.

Referring to FIG. 2, in step 210, the UE sends its energy information to the base station. In an embodiment, the UE may send energy information to the base station through an assistance message (e.g., a Radio Resource Control (RRC) message) of the UE. However, this is only exemplary, and the inventive concept is not limited thereto.

According to the embodiments of the present disclosure, the energy information of the UE may include at least one of whether the UE is in an active state and power information of the UE. In an embodiment, whether the UE is in the active state may include at least one of the following: whether the UE being in a wired charging state or a wireless charging state; a magnitude of a charging power of the UE; and whether the UE being in a high-power charging state or a low-power charging state. The power information may include information indicating battery information of the UE, where the batter information may include battery level, battery usage history, etc.

In an embodiment, the UE being in the active state may indicate that the UE is in a charging state and/or a power state predefined according to performances and/or structures of the base station and the UE, for example, it indicates that the UE can support a charging state and/or a power state of a first configuration. The UE being not in the active state may indicate that the UE is in an uncharged state or in a charging state and/or a power state that cannot support the first configuration but can support a second configuration, which may be predefined according to the performances and/or the structures of the base station and the UE. In addition, further description will be given below with respect to the first configuration and the second configuration.

In an embodiment, the power information of the UE may include the remaining power of the UE or an absolute value of the remaining power of the UE, a percentage of the remaining power of the UE, a high or low power state of the UE, and/or a battery capacity of the UE, and the like. The above description about the energy information of the UE is only exemplary, and the inventive concept is not limited thereto. Any information that can indicate an energy state of the UE is feasible.

According to the embodiments of the present disclosure, the UE may send the energy information based on control signaling from the base station. That is, a manner in which the UE sends the energy information to the base station is determined through the control signaling from the base station.

In an embodiment, the method shown in FIG. 2 may further include: the UE receives control signaling sent by the base station. In this case, the operation of the step 210 may include the UE sends the energy information of the UE to the base station based on the control signaling. However, this is only exemplary, and the inventive concept is not limited thereto. For example, the UE may pre-agreed with the base station through various protocols on the manner in which the UE sends the energy information to the base station, without additionally receiving the control signaling.

The control signaling received by the UE may include various contents that define a manner in which the UE reports the energy information, for example, the control signaling may include whether the UE is allowed to report the energy information, a period for the UE to report the energy information, an event that the UE reports the energy information and/or a prohibit timer, etc.

According to the embodiments of the present disclosure, when the control signaling includes allowing the UE to report the energy information, the sending, by the UE, the energy information to the base station based on the control signaling may include: in response to a change in the energy information of the UE, the UE reports the energy information of the UE to the base station; and in response to that the UE has not reported the energy information yet, the UE directly reports the energy information of the UE. The change in the energy information of the UE may include a change in the active state of the UE (e.g., changing from the wired charging to the wireless charging, changing from the active state to a power-off state, etc.), a change in the power information (e.g., changing from the high-power charging to the low-power charging), etc. The UE having not yet reported the energy information may indicate that the UE has not reported the energy information to the base station when or before the UE receives the control signaling from the base station that allows the reporting of the energy information. In this case, the UE can directly report the energy information to the base station without waiting for the change in the energy information.

In addition, when the control signaling includes prohibiting the UE from reporting the energy information, the UE will not report the energy information to the base station regardless of the energy state of the UE and whether the energy information changes.

According to the embodiments of the present disclosure, when the control signaling indicates the UE to report the energy information at a predetermined period, the sending, by the UE, the energy information to the base station based on the control signaling may include: the UE periodically reports the energy information of the UE to the base station according to the predetermined period. That is to say, the period for the UE to report the energy information can be defined in the control signaling.

According to the embodiments of the present disclosure, when the control signaling indicates the UE to report the energy information when a reporting event is satisfied, the sending, by the UE, the energy information to the base station based on the control signaling may include: when the reporting event is satisfied, the UE sends the energy information of the UE to the base station. That is, the control signaling can define which event occurs the UE can report the energy information. In the embodiments, according to such control signaling, the UE can send the energy information of the UE to the base station when a specific event (i.e., the reporting event) occurs, so that the base station can obtain the energy state of the UE in time to provide a configuration suitable for the current state of the UE.

According to the embodiments of the present disclosure, the reporting event may include any of the following: the remaining power of the UE reaches a remaining power threshold; a percentage of the remaining power of the UE reaches a remaining power percentage threshold; and the charging power of the UE reaches a charging power threshold. It should be understood that this is only exemplary and the inventive concept is not limited thereto. In addition, the remaining power threshold, the remaining power percentage threshold and the charging power threshold may be determined according to a battery or energy performance of the UE, which is not specifically limited by the inventive concept.

According to the embodiments of the present disclosure, when the control signaling includes a prohibit timer for stopping the UE from reporting the energy information, the sending, by the UE, the energy information to the base station based on the control signaling may include: when the UE sends the energy information of the UE to the base station, the prohibit timer is started, and during the running of the prohibit timer, the UE cannot report the energy information of the UE to the base station again. The prohibit timer may be implemented in various manners, which are not specifically limited by the present disclosure. The setting of the prohibit timer can prevent the UE from frequently sending the energy information to the base station, thereby reducing energy consumption and resource waste of the UE and the base station.

With continued reference to FIG. 2, in step 220, the UE may receive configuration information sent by the base station, and the configuration information is determined by the base station according to the energy information sent in the step 210. When the UE is in the active state or has a relatively high power, the base station may select the first configuration (e.g., a configuration with higher energy consumption) to serve the UE, and otherwise, select a second configuration (e.g., a configuration with lower energy consumption) for the UE. However, the inventive concept is not limited only to the two configurations of the first configuration and the second configuration, and may include more types of configurations. For example, assuming that the UE being in the active state means that the UE is in the wired charging state and/or the high-power charging state, and then when the energy information of the UE includes information that the UE is in the wired charging state and/or the high-power charging state, the base station will select the first configuration (e.g., the configuration with the higher energy consumption) for the UE. In contrast, when the UE is not in the charging state or the UE is in a state such as the wireless charging state and/or the low-power charging state, this means that the UE is not in the active state, and accordingly, the base station can select the second configuration (e.g., the configuration with the lower energy consumption) for the UE.

According to the embodiments of the present disclosure, when the energy information indicates that the UE is in the active state or the power in the power information is higher than a first power threshold, the configuration information received by the UE is the first configuration. In an example, the power in the power information being higher than the first power threshold may mean that the remaining power of the UE or the percentage of the remaining power of the UE is higher than the power threshold, etc., but the inventive concept is not limited thereto. As an example, the first configuration may include information that enables the UE to perform communication using a configuration that is not sensitive to the consumption of the power, for example, more band combinations are configured within a capability range of the UE to send and receive a signal. As another example, for a NTN UE in the active state or having a relatively high power, the first configuration may, for example, include information that the UE may perform the communication via a high-orbit satellite, in which case handover may be reduced, providing robustness.

According to the embodiments of the present disclosure, when the energy information indicates that the UE is not in the active state or the power in the power information is lower than a second power threshold, the configuration information received by the UE is the second configuration. As an example, the second configuration may include information that enables the UE to perform the communication using a configuration that can reduce the consumption of the power, for example, the UE is handed over to a base station at a lower altitude, so as to enable a transmit power of the UE to be reduced. According to the embodiments, the base station may determine the first power threshold and the second power threshold based on the battery capacity in the energy information, and the two thresholds may be the same or different, which is not specifically limited by the present disclosure.

With continued reference to FIG. 2, in step 230, the UE may communicate with the base station based on the configuration information received in the step 220. In an embodiment, when the UE receives the first configuration (e.g., the configuration with the high energy consumption)), the UE may be connect to a base station in a higher orbit and/or perform the communication by means of a higher performance transceiving parameter configuration. For example, the UE communicates with the base station by means of a higher bandwidth or a higher transmit power.

Figure 3:
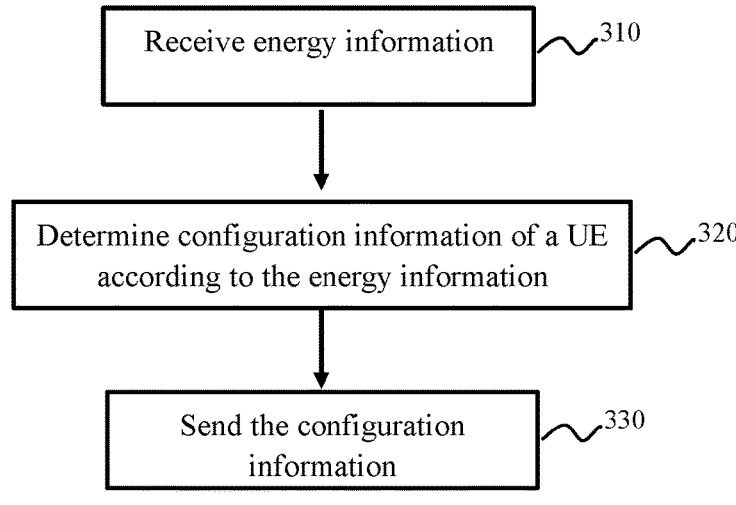
FIG. 3 is a flowchart showing a method for providing configuration information according to an embodiment of the present disclosure.

FIG. 3 is a flowchart showing a method for providing configuration information according to an embodiment of the present disclosure. The method may be applied in the wireless communication system shown in FIG. 1, and may be performed by the base station 110 in FIG. 1.

Referring to FIG. 3, in step 310, the base station may receive energy information sent by the UE. The description about the energy information in the step 210 of FIG. 2 can be applied to the step 310, and repeated descriptions are omitted for brevity.

Corresponding to the above description, the method shown in FIG. 3 may also send the control signaling to the UE, thereby defining the manner in which the UE sends the energy information. The control signaling sent by the base station may include at least one of the following: allowing the UE to report the energy information; indicating the UE to report the energy information at the predetermined period; the prohibit timer for stopping the UE from reporting the energy information; and indicating the UE to report the energy information when the reporting event is satisfied. For a detailed description of the control signaling, reference may be made to FIG. 2, and repeated descriptions are omitted here for brevity.

In step 320, the base station determines the configuration information of the UE based on the energy information of the UE. In an embodiment, the step 320 may include: when the energy information indicates that the UE is in the active state or the power in the power information is higher than the first power threshold, the first configuration is configured for the UE; and when the energy information indicates that the UE is not in the active state or the power in the power information is lower than the second power threshold, the second configuration is configured for the UE. The description about the energy information and the configuration information is similar to the description of FIG. 2, and repeated descriptions are omitted here for brevity.

In step 330, the base station may send the configuration information to the UE, so that the UE may communicate with the base station according to the configuration information.

The steps of the methods in FIGS. 2 and 3 described above are only exemplary, and the inventive concept is not limited thereto. For example, the steps in FIGS. 2 and 3 may not be performed sequentially in an order shown, but may be performed in parallel or in another order. In addition, the steps in FIGS. 2 and 3 may also be repeatedly performed according to practical applications.

The method for obtaining the configuration information in FIG. 2 and the method for providing the configuration information in FIG. 3 provided according to the embodiments of the present disclosure both enable the base station to obtain the energy information of the user terminal, and provide the user terminal with an appropriate configuration based on the energy information, thereby improving the QoE of the user terminal, improving the frequency utilization in the wireless communication network and increases its capacity.

Figure 4:
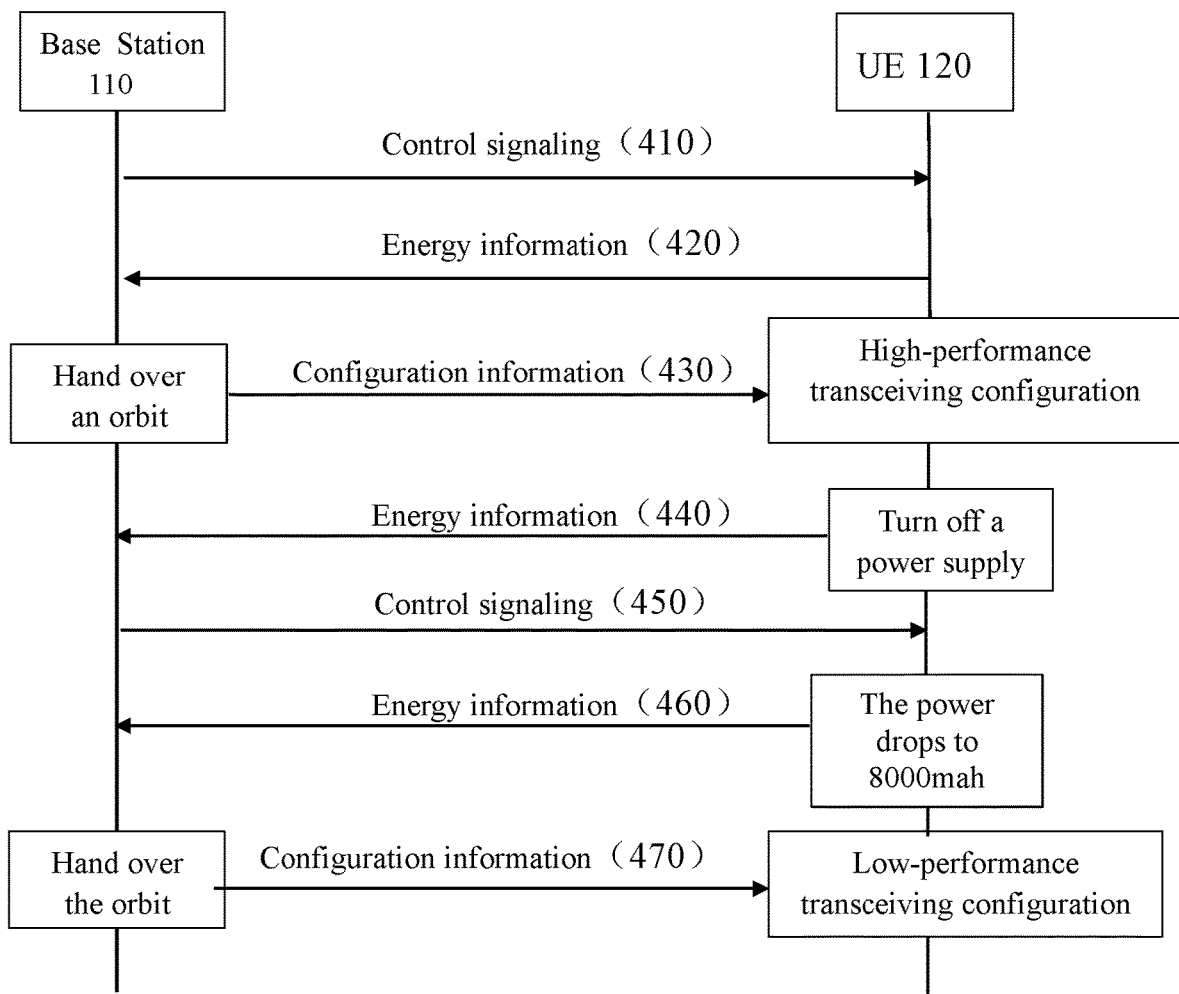
FIG. 4 is a schematic diagram showing communication between a base station 110 and a UE 120 according to an embodiment of the present disclosure.

FIG. 4 is a schematic diagram showing communication between the base station 110 and the UE 120 according to an embodiment of the present disclosure. In FIG. 4, it may be first assumed that the base station 110 is a low-orbit satellite base station (e.g., a low-earth orbit satellite base station).

Referring to FIG. 4, in step 410, the low-orbit satellite base station may send control signaling to the UE 120, and the control signaling indicates that the UE is allowed to report energy information to the base station.

In step 420, it is assumed that the UE 120 has not reported the energy information yet when or before receiving the control signaling, and accordingly, the UE 120 sends its energy information to the base station. As an example, the energy information may include that the UE 120 is in a high-power charging state and its battery capacity is, for example, 10000 milliamps (mah) or more.

Since the energy information received by the base station 110 indicates that the UE 120 is not sensitive to the consumption of the power, the UE 120 can be handed over from the low-orbit satellite base station to a geosynchronous orbit satellite base station based on the energy information of the UE 120. However, this is only exemplary, and the inventive concept is not limited thereto. For example, the low-orbit satellite base station can be handed over to a higher-orbit satellite base station (e.g., a polar-orbit satellite base station). According to another example, the handover of the base station may be performed not only based on the energy information of the UE, but also based on a signal strength of the UE, a moving speed of the UE, and the like. In addition, in step 430, configuration information about the handover of the base station may be sent to the UE 120, so that the UE 120 may perform the communication using the high-performance transceiving configuration to improve the QoE of the user terminal.

With continued reference to FIG. 4, when the UE is powered off (i.e., the energy information of the UE changes), in step 440, the UE 120 may report the energy information to the geosynchronous orbit satellite base station, and the energy information may include that the UE is not in the active state and the remaining power is 1000 mah.

In step 450, the geosynchronous orbit satellite base station may send the control signaling to the UE 120, and the control signaling may configure a reporting event for the UE, that is, the control signaling indicates the UE to report the energy information when the reporting event is satisfied.

As an example, the reporting event is that the remaining power of the UE 120 reaches a remaining power threshold, e.g., 8000 mah.

When the power of the UE 120 drops to 8000 mah, in step 460, the UE 120 sends the energy information that the remaining power is 8000 mah to the geosynchronous orbit satellite base station.

Based on the energy information sent in the step 460, the geosynchronous orbit satellite base station may hand over the UE 120 to the low-orbit satellite base station, and in step 470, the geosynchronous orbit satellite base station sends the configuration information about the handover of the base station to the UE 120. The UE 120 may perform the communication using a low-performance transceiving configuration (e.g., a reduced transmit power, etc.) based on the configuration information.

The embodiment in FIG. 4 described above is only exemplary, and the inventive concept is not limited thereto. For example, some steps in FIG. 4 may be omitted, or some steps in FIG. 4 may be replaced with other embodiments described above, or additional steps may also be included.

Figure 5:
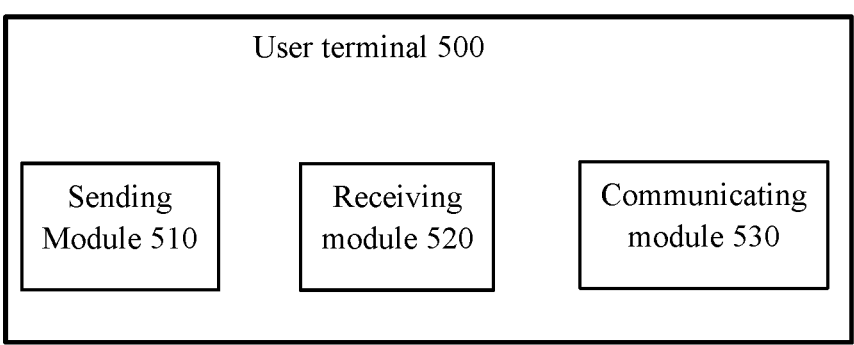
FIG. 5 is a schematic diagram showing a user terminal according to an embodiment of the present disclosure.

FIG. 5 is a schematic diagram showing a user terminal 500 according to an embodiment of the present disclosure.

Referring to FIG. 5, the user terminal 500 according to the embodiment of the present disclosure may include a sending module 510, a receiving module 520 and a communicating module 530. It will be understood that a configuration of the user terminal 500 shown in FIG. 5 is only exemplary, and the user terminal according to the embodiment of the present disclosure may include more or less modules.

According to the embodiments of the present disclosure, the sending module 510 may be configured to send energy information of the UE to the base station. In other words, the sending module 510 may perform the operation of the step 210 in FIG. 2, and repeated descriptions will be omitted for brevity.

According to the embodiments of the present disclosure, the receiving module 520 may be configured to receive configuration information sent by the base station, and the configuration information is determined by the base station according to the energy information. In other words, the receiving module 520 may perform the operation of the step 220 in FIG. 2, and repeated descriptions will be omitted for brevity.

According to the embodiments of the present disclosure, the communicating module 530 may be configured to communicate with the base station based on the configuration information. In other words, the communicating module 530 may perform the operation of the step 230 in FIG. 2, and repeated descriptions will be omitted for brevity.

Figure 6:
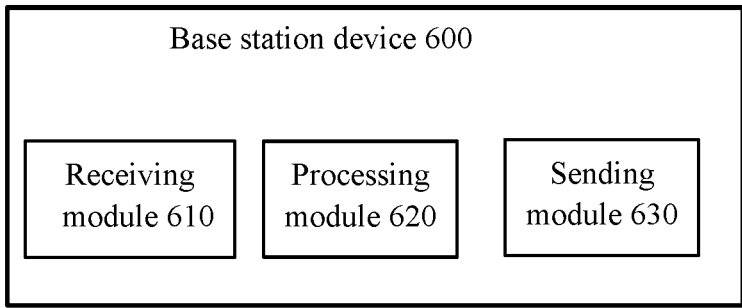
FIG. 6 is a schematic diagram showing a base station device according to an embodiment of the present disclosure.

FIG. 6 is a schematic diagram showing a base station device 600 according to an embodiment of the present disclosure.

Referring to FIG. 6, the base station device 600 according to the embodiment of the present disclosure may include a receiving module 610, a processing module 620 and a sending module 630. It will be understood that a configuration of the base station device 600 shown in FIG. 6 is only exemplary, and the base station device according to the embodiment of the present disclosure may include more or less modules.

According to the embodiments of the present disclosure, the receiving module 610 may be configured to receive energy information sent by the UE. In other words, the receiving module 610 may perform the operation of the step 310 in FIG. 3, and repeated descriptions will be omitted for brevity.

According to the embodiments of the present disclosure, the processing module 620 may be configured to determine configuration information of the UE based on the energy information. In other words, the processing module 620 may perform the operation of the step 320 in FIG. 3, and repeated descriptions will be omitted for brevity.

According to the embodiments of the present disclosure, the sending module 630 may be configured to send the configuration information to the UE. In other words, the sending module 630 may perform the operation of the step 330 in FIG. 3, and repeated descriptions will be omitted for brevity.

The user terminal in FIG. 5 and the base station device in FIG. 6 provided according to the embodiments of the present disclosure both enable the base station to obtain the energy information of the user terminal, and provide the user terminal with the appropriate configuration based on the energy information, thereby improving the QoE of the user terminal, improving the frequency utilization in the wireless communication network and increases its capacity.

Based on the same principles as the methods provided by the embodiments of the present disclosure, the embodiments of the present disclosure further provide an electronic device, and the electronic device includes a processor and a memory. The memory stores machine-readable instructions (which may also be referred to as a "computer program"), and the processor is configured to execute the machine-readable instructions to implement any of the methods shown in FIGS. 2, 3 and 4.

As an example, the electronic device may be used as a part of the user terminal or the base station, but the inventive concept is not limited thereto, for example, the electronic device may be used as another node separate from the user terminal or the base station.

The embodiments of the present disclosure further provide a computer-readable storage medium having a computer program stored thereon, and the computer program, when executed by a processor, implements any one of the methods shown in FIGS. 2, 3 and 4.

Figure 7:
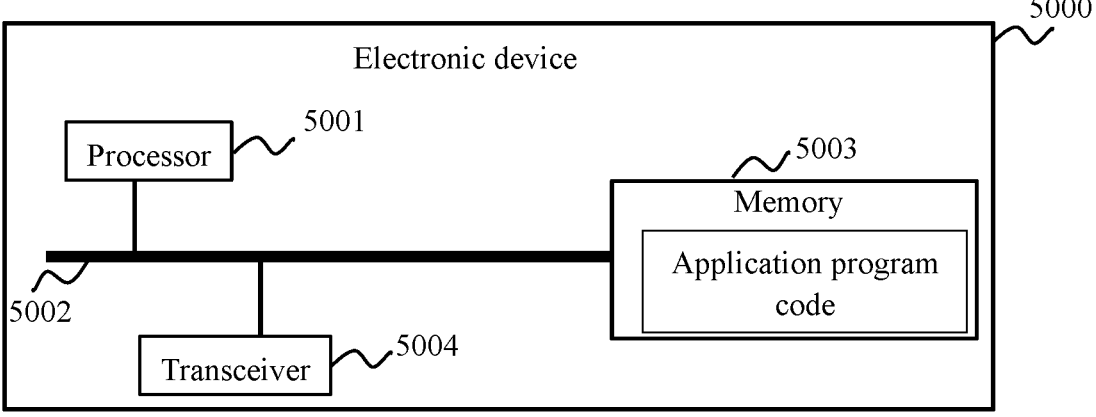
FIG. 7 is a schematic diagram showing an electronic device according to an embodiment of the present disclosure.

FIG. 7 is a schematic diagram showing an electronic device 5000 according to an embodiment of the present disclosure.

Referring to FIG. 7, the electronic device 5000 includes a processor 5001 and a memory 5003. The processor 5001 is connected to the memory 5003, for example, through a bus 5002. In some embodiments, the electronic device 5000 may further include a transceiver 5004. It should be noted that, in practical applications, the transceiver 5004 is not limited to one, and a structure of the electronic device 5000 does not constitute a limitation on the embodiments of the present disclosure.

The processor 5001 may be a Central Processing Unit (CPU), a general-purpose processor, a Digital Signal Processor (DSP), an Application Specific Integrated Circuit (ASIC), a Field Programmable Gate Array (FPGA), or other programmable logic devices, a transistor logic device, a hardware component, or any combination thereof, which can implement or execute various exemplary logical blocks, modules and circuits described in connection with the disclosure. The processor 5001 may also be a combination that implements computing functions, including, for example, a combination of one or more microprocessors, a combination of the DSP and a microprocessor, and the like.

The bus 5002 may include a path that communicates information between the above-described components. The bus 5002 may be a Peripheral Component Interconnect (PCI) bus, an Extended Industry Standard Architecture (EISA) bus or the like. The bus 5002 can be divided into an address bus, a data bus, a control bus, and the like. For ease of illustration, the bus is only denoted by a thick line in FIG. 7, but it does not mean that there is only one bus or one type of bus.

The memory 5003 may be a static storage device that can store static information and instructions or a dynamic storage device that can store information and instructions, for example, a Read Only Memory (ROM), a Random Access Memory (RAM), an Electrically Erasable Programmable Read Only Memory (EEPROM), a Compact Disc Read Only Memory (CD-ROM) or other CD storage, an optical disk storage (including a compressed disk, a laser disk, an optical disk, a digital universal compact disk, a Blu-ray disk, etc.), a magnetic disc storage medium or other magnetic storage devices, or any other medium that can be used to carry or store program codes in the form of instructions or data structures and that can be accessed by a computer, but the memory 503 is not limited to this.

The memory 5003 is configured to store application program codes for executing the solutions of the present disclosure, and the execution is controlled by the processor 5001. The processor 5001 is configured to execute the application program codes stored in the memory 5003, so as to implement the content shown in any of the foregoing method embodiments.

An aspect of the present disclosure provides a method for obtaining configuration information, and the method may include: sending, by a user terminal, energy information of the user terminal to a base station; receiving, by the user terminal, configuration information sent by the base station, where the configuration information is determined by the base station according to the energy information; and communicating, by the user terminal, with the base station based on the configuration information.

According to an example, the energy information includes at least one of the following: whether the user terminal being in an active state; and power information of the user terminal.

According to an example, whether the user terminal is in the active state includes at least one of the following: information about whether the user terminal being in a wireless charging state or a wired charging state; a magnitude of a charging power of the user terminal; and information about whether the user terminal being in a high-power charging state or a low-power charging state.

According to an example, when the energy information indicates that the user terminal is in the active state or a power in the power information is higher than a first power threshold, the configuration information is a first configuration; and when the energy information indicates that the user terminal is not in the active state or the power in the power information is lower than a second power threshold, the configuration information is a second configuration.

According to an example, the method further includes: receiving, by the user terminal, control signaling sent by the base station; where the sending, by the user terminal, the energy information of the user terminal to the base station includes: sending, by the user terminal, the energy information of the user terminal to the base station based on the control signaling.

According to an example, when the control signaling includes allowing the user terminal to report the energy information, the sending, by the user terminal, the energy information of the user terminal to the base station based on the control signaling includes: reporting, by the user terminal, the energy information of the user terminal to the base station in response to a change in the energy information of the user terminal; and directly reporting, by the user terminal, the energy information of the user terminal in response to having not reporting the energy information by the user terminal yet.

According to an exemplary, when the control signaling indicates the user terminal to report the energy information at a predetermined period, the sending, by the user terminal, the energy information of the user terminal to the base station based on the control signaling includes: periodically reporting, by the user terminal, the energy information of the user terminal to the base station according to the predetermined period.

According to an example, when the control signaling indicates the user terminal to report the energy information in a case where a reporting event is satisfied, the sending, by the user terminal, the energy information of the user terminal to the base station based on the control signaling includes: sending, by the user terminal, the energy information of the user terminal to the base station when the reporting event is satisfied, where the reporting event includes any one of the following: a remaining power of the user terminal reaching a remaining power threshold; a percentage of the remaining power of the user terminal reaches a remaining power percentage threshold; and the charging power of the user terminal reaches a charging power threshold.

According to an example, when the control signaling includes a prohibit timer for stopping the user terminal from reporting the energy information, the sending, by the user terminal, the energy information of the user terminal to the base station based on the control signaling includes: starting the prohibit timer when the energy information of the user terminal is sent by the user terminal to the base station; and disabling reporting the energy information of the user terminal by the user terminal to the base station again during running of the prohibit timer.

An aspect of the present disclosure provides a method for configuring information, and the method may include: receiving, by a base station, energy information sent by a user terminal; determining, by the base station, configuration information of the user terminal based on the energy information; and sending, by the base station, the configuration information to the user terminal.

According to an example, the energy information includes at least one of the following: whether the user terminal being in an active state; and power information of the user terminal.

According to an example, whether the user terminal is in the active state includes at least one of the following: whether the user terminal being in a wireless charging state or a wired charging state; a magnitude of a charging power of the user terminal; and whether the user terminal being in a high-power charging state or a low-power charging state.

According to an example, the determining, by the base station, the configuration information of the user terminal based on the energy information includes: when the energy information indicates that the user terminal is in the active state or a power in the power information is higher than a first power threshold, configuring a first configuration for the user terminal; and when the energy information indicates that the user terminal is not in the active state or the power in the power information is lower than a second power threshold, configuring a second configuration for the user terminal.

According to an example, the method further includes: sending, by the base station, control signaling to the user terminal, where the energy information is sent by the user terminal based on the control signaling.

According to an example, the control signaling includes at least one of the following: information allowing the user terminal to report the energy information; information indicating the user terminal to report the energy information at a predetermined period; a prohibit timer for stopping the user terminal from reporting the energy information; and indicating the user terminal to report the energy information in a case where a reporting event is satisfied.

According to an example, the reporting event includes any one of the following: a remaining power of the user terminal reaching a remaining power threshold; a percentage of the remaining power of the user terminal reaches a remaining power percentage threshold; and the charging power of the user terminal reaches a charging power threshold.

An aspect of the present disclosure provides a user terminal, including: a sending module, configured to send energy information of the user terminal to a base station; a receiving module, configured to receive configuration information sent by the base station, where the configuration information is determined by the base station according to the energy information; and a communicating module, configured to communicate with the base station based on the configuration information.

According to an example, the energy information includes at least one of the following: whether the user terminal being in an active state; and power information of the user terminal.

According to an example, whether the user terminal is in the active state includes at least one of the following: whether the user terminal being in a wireless charging state or a wired charging state; a magnitude of a charging power of the user terminal; and whether the user terminal being in a high-power charging state or a low-power charging state.

According to an example, when the energy information indicates that the user terminal is in the active state or a power in the power information is higher than a first power threshold, the configuration information is a first configuration; and when the energy information indicates that the user terminal is not in the active state or the power in the power information is lower than a second power threshold, the configuration information is a second configuration.

According to an example, the receiving module is further configured to receive control signaling sent by the base station, and where the sending module is further configured to send the energy information of the user terminal to the base station based on the control signaling.

According to an example, when the control signaling includes allowing the user terminal to report the energy information, the sending module is further configured to: report the energy information of the user terminal to the base station in response to a change in the energy information of the user terminal; and directly report the energy information of the user terminal in response to having not reporting the energy information of the user terminal by the sending module yet.

According to an exemplary, when the control signaling indicates the user terminal to report the energy information at a predetermined period, the sending module is further configured to periodically report the energy information of the user terminal to the base station according to the predetermined period.

According to an example, when the control signaling indicates the user terminal to report the energy information in a case where a reporting event is satisfied, the sending module is further configured to send the energy information of the user terminal to the base station when the reporting event is satisfied, where the reporting event includes any one of the following: a remaining power of the user terminal reaching a remaining power threshold; a percentage of the remaining power of the user terminal reaches a remaining power percentage threshold; and the charging power of the user terminal reaches a charging power threshold.

According to an example, when the control signaling includes a prohibit timer for stopping the user terminal from reporting the energy information, the sending module is further configured to: start the prohibit timer when the energy information of the user terminal is sent by the sending module to the base station; and disable reporting the energy information of the user terminal by the sending module to the base station again during running of the prohibit timer.

An aspect of the present disclosure provides a base station device, including: a receiving module, configured to receive energy information sent by a user terminal; a processing module, configured to determine configuration information of the user terminal based on the energy information; and a sending module, configured to send the configuration information to the user terminal.

According to an example, the energy information includes at least one of the following: information about whether the user terminal being in an active state; and power information of the user terminal.

According to an example, whether the user terminal is in the active state includes at least one of the following: whether the user terminal being in a wireless charging state or a wired charging state; a magnitude of a charging power of the user terminal; and whether the user terminal being in a high-power charging state or a low-power charging state.

According to an example, the processing module is further configured to: when the energy information indicates that the user terminal is in the active state or a power in the power information is higher than a first power threshold, configure a first configuration for the user terminal; and when the energy information indicates that the user terminal is not in the active state or the power in the power information is lower than a second power threshold, configure a second configuration for the user terminal.

According to an example, the sending module is further configured to send control signaling to the user terminal, where the energy information is sent by the user terminal based on the control signaling.

According to an example, the control signaling includes at least one of the following: information allowing the user terminal to report the energy information; information indicating the user terminal to report the energy information at a predetermined period; a prohibit timer for stopping the user terminal from reporting the energy information; and information indicating the user terminal to report the energy information in a case where a reporting event is satisfied.

According to an example, the reporting event includes any one of the following: a remaining power of the user terminal reaching a remaining power threshold; a percentage of the remaining power of the user terminal reaches a remaining power percentage threshold; and the charging power of the user terminal reaches a charging power threshold.

An aspect of the present disclosure provides an electronic device, including a memory, a processor, and a computer program stored on the memory and executable on the processor, where the processor implements the method described above when executing the computer program.

An aspect of the present disclosure provides a non-transitory computer-readable storage medium having a computer program stored thereon, which, when executed by a processor, implements the method described above.

The method, the user terminal, the base station device and the electronic device provided according to the embodiments of the present disclosure enable the base station to obtain the energy information of the user terminal, and provide a suitable configuration for the user terminal based on the energy information, thereby improving Quality of Experience (QoE) of the user terminal, and improving frequency utilization in wireless communication networks and increase their capacity.

It is to be understood that although respective steps in the flowcharts of the drawings are displayed in sequence according to the indication of arrows, these steps are not necessarily performed in the sequence indicated by the arrows. Unless otherwise explicitly specified in the present disclosure, execution of these steps is not strictly limited by the sequence, and the steps may be performed in other sequences. In addition, at least part of the steps in the flowcharts of the drawings may include a plurality of sub-steps or a plurality of stages. These sub-steps or stages are not necessarily completed at the same moment, but may be performed at different moments. Besides, these sub-steps or stages may not be necessarily performed sequentially, but may be performed in turn or alternately with other steps or at least part of sub-steps or stages of other steps.

Although the present disclosure has been shown and described with reference to certain embodiments of the present disclosure, it will be understood by those skilled in the art that various changes in forms and details may be made therein without departing from the scope of the present disclosure. Therefore, the scope of the present disclosure should not be limited by the embodiments, but should be defined by the appended claims and their equivalents.

What is claimed is:

1. A method for obtaining configuration information, comprising:

sending, by a user terminal, energy information of the user terminal to a base station;

receiving, by the user terminal, configuration information sent by the base station, wherein the configuration information is determined by the base station according to the energy information; and communicating, by the user terminal, with the base station based on the configuration information, wherein the method further comprises:

receiving, by the user terminal, control signaling sent by the base station;

wherein sending, by the user terminal, the energy information of the user terminal to the base station comprises:

sending, by the user terminal, the energy information of the user terminal to the base station based on the control signaling, wherein, in response to determining that the control signaling allows the user terminal to report the energy information, sending, by the user terminal, the energy information of the user terminal to the base station based on the control signaling comprises:

directly reporting, by the user terminal, the energy information of the user terminal in response to determining that no energy information has been reported by the user terminal, wherein the energy information comprises information indicating whether the user terminal is in an active state, the user terminal being in the active state indicating that the user terminal is in a charging power state, predefined according to at least one of performances or structures of the base station and the user terminal, that is capable of supporting a first configuration, and the user terminal being in an inactive state indicating that the user terminal is in a charging power state that is incapable of supporting the first configuration and is capable of supporting a second configuration;

wherein when the information in the energy information indicates that the user terminal is in the active state, the configuration information is configured to indicate to the user terminal to communicate with a high-orbit satellite base station, and when the information in the energy information indicates that the user terminal is in the inactive state, the configuration information is configured to indicate to the user terminal to communicate with a low-orbit satellite base station.

2. The method according to claim 1, wherein the energy information further comprises:

power information of the user terminal.

3. The method according to claim 1, wherein the information indicating whether the user terminal is in the active state comprises at least one of the following information:

information indicating whether the user terminal being is in a wireless charging state or a wired charging state;

a magnitude of a charging power of the user terminal; or information indicating whether the user terminal is in a high-power charging state or a low-power charging state.

4. The method according to claim 2, wherein, in response to determining that the energy information indicates that the user terminal is in the active state or a power in the power information is higher than a first power threshold, the configuration information comprises the first configuration; and in response to determining that the energy information indicates that the user terminal is in the inactive state or the power in the power information is lower than a second power threshold, the configuration information comprises the second configuration.

5. The method according to claim 1, further comprises:

wherein in response to determining that the control signaling indicates that the user terminal is to report the energy information at a predetermined period, sending, by the user terminal, the energy information of the user terminal to the base station based on the control signaling comprises:

periodically reporting, by the user terminal, the energy information of the user terminal to the base station according to the predetermined period.

6. The method according to claim 1, wherein, in response to determining that the control signaling indicates that the user terminal is to report the energy information in response to determining that a reporting event is satisfied, sending, by the user terminal, the energy information of the user terminal to the base station based on the control signaling comprises:

sending, by the user terminal, the energy information of the user terminal to the base station in response to determining that the reporting event is satisfied; and wherein the reporting event comprises one of the following events:

a remaining power of the user terminal reaching a remaining power threshold;

a percentage of the remaining power of the user terminal reaching a remaining power percentage threshold; or a charging power of the user terminal reaching a charging power threshold.

7. The method according to claim 1, wherein, in response to determining that the control signaling comprises a prohibit timer for stopping the user terminal from reporting the energy information, sending, by the user terminal, the energy information of the user terminal to the base station based on the control signaling, comprises:

starting the prohibit timer in response to determining that the energy information of the user terminal is sent by the user terminal to the base station; and disabling the user terminal from reporting the energy information of the user terminal to the base station again during running of the prohibit timer.

8. A method for providing configuration information, comprising:

receiving, by a base station, energy information sent by a user terminal;

determining, by the base station, configuration information of the user terminal based on the energy information; and sending, by the base station, the configuration information to the user terminal, wherein the method further comprises:

sending, by the base station, control signaling to the user terminal, wherein the control signaling comprises information allowing the user terminal to report the energy information;

wherein the energy information of the user terminal is directly reported by the user terminal in response to determining that no energy information has been reported by the user terminal, wherein the energy information comprises information indicating whether the user terminal is in an active state, the user terminal being in the active state indicating that the user terminal is in a charging power state, predefined according to at least one of performances or structures of the base station and the user terminal, that is capable of supporting a first configuration, and the user terminal being in an inactive state indicating that the user terminal is in a charging power state that is incapable of supporting the first configuration and is capable of supporting a second configuration;

wherein when the information in the energy information indicates that the user terminal is in the active state, the configuration information is configured to indicate to the user terminal to communicate with a high-orbit satellite base station, and when the information in the energy information indicates that the user terminal is in the inactive state, the configuration information is configured to indicate to the user terminal to communicate with a low-orbit satellite base station.

9. The method according to claim 8, wherein the energy information further comprises:

power information of the user terminal.

10. The method according to claim 8, wherein the information indicating whether the user terminal is in the active state comprises at least one of the following information:

information indicating whether the user terminal is in a wireless charging state or a wired charging state;

a magnitude of a charging power of the user terminal; or information indicating whether the user terminal is in a high-power charging state or a low-power charging state.

11. The method according to claim 9, wherein determining, by the base station, the configuration information of the user terminal based on the energy information comprises:

configuring the first configuration for the user terminal in response to determining that the energy information indicates that the user terminal is in the active state or a power in the power information is higher than a first power threshold; and configuring the second configuration for the user terminal in response to determining that the energy information indicates that the user terminal is in the inactive state or the power in the power information is lower than a second power threshold.

12. The method according to claim 8, wherein the control signaling comprises at least one of the following information:

information indicating that the user terminal is to report the energy information at a predetermined period;

a prohibit timer for stopping the user terminal from reporting the energy information; or information indicating that the user terminal is to report the energy information in response to determining that a reporting event is satisfied.

13. The method according to claim 12, wherein the reporting event comprises one of the following events:

a remaining power of the user terminal reaching a remaining power threshold;

a percentage of the remaining power of the user terminal reaching a remaining power percentage threshold; or a charging power of the user terminal reaching a charging power threshold.

14. A user terminal, comprising: a memory, a processor and a computer program stored on the memory and executable on the processor, wherein the processor is configured to:

send energy information of the user terminal to a base station;

receive configuration information sent by the base station, wherein the configuration information is determined by the base station according to the energy information; and communicate with the base station based on the configuration information, wherein the processor is further configured to:

receive control signaling sent by the base station;

wherein send the energy information of the user terminal to the base station comprises:

send the energy information of the user terminal to the base station based on the control signaling, wherein, in response to determining that the control signaling allows the user terminal to report the energy information, send the energy information of the user terminal to the base station based on the control signaling comprises:

directly report the energy information of the user terminal in response to determining that no energy information has been reported by the user terminal, wherein the energy information comprises information indicating whether the user terminal is in an active state, the user terminal being in the active state indicating that the user terminal is in a charging power state, predefined according to at least one of performances or structures of the base station and the user terminal, that is capable of supporting a first configuration, and the user terminal being in an inactive state indicating that the user terminal is in a charging power state that is incapable of supporting the first configuration and is capable of supporting a second configuration;

wherein when the information in the energy information indicates that the user terminal is in the active state, the configuration information is configured to indicate to the user terminal to communicate with a high-orbit satellite base station, and when the information in the energy information indicates that the user terminal is in the inactive state, the configuration information is configured to indicate to the user terminal to communicate with a low-orbit satellite base station.

15. The user terminal according to claim 14, wherein the energy information further comprises:

power information of the user terminal.

16. The user terminal according to claim 14, wherein the information indicating whether the user terminal is in the active state comprises at least one of the following information:

information indicating whether the user terminal is in a wireless charging state or a wired charging state;

a magnitude of a charging power of the user terminal; or information indicating whether the user terminal being is in a high-power charging state or a low-power charging state.

17. The user terminal according to claim 15, wherein, in response to determining that the energy information indicates that the user terminal is in the active state or a power in the power information is higher than a first power threshold, the configuration information comprises the first configuration; and in response to determining that the energy information indicates that the user terminal is in the inactive state or the power in the power information is lower than a second power threshold, the configuration information comprises the second configuration.

18. The user terminal according to claim 14, wherein the processor is further configured to:

in response to determining that the control signaling indicates that the user terminal is to report the energy information at a predetermined period, periodically report the energy information of the user terminal to the base station according to the predetermined period.

19. The user terminal according to claim 14, wherein the processor is further configured to:

in response to determining that the control signaling indicates that the user terminal is to report the energy information in response to determining that a reporting event is satisfied, send the energy information of the user terminal to the base station in response to determining that the reporting event is satisfied, wherein the reporting event comprises one of the following events:

a remaining power of the user terminal reaching a remaining power threshold;

a percentage of the remaining power of the user terminal reaching a remaining power percentage threshold; or a charging power of the user terminal reaching a charging power threshold.

20. The user terminal according to claim 14, wherein the processor is further configured to:

in response to determining that the control signaling comprises a prohibit timer for stopping the user terminal from reporting the energy information, send the energy information of the user terminal to the base station based on the control signaling, wherein to send the energy information of the user terminal to the base station based on the control signaling, the processor is further configured to:

start the prohibit timer in response to sending the energy information of the user terminal to the base station; and disable the user terminal from reporting the energy information of the user terminal to the base station again during running of the prohibit timer.

* * * * *